United States Patent
Sakhawat et al.

(10) Patent No.: US 11,480,023 B2
(45) Date of Patent: Oct. 25, 2022

(54) SYSTEM AND METHOD FOR POWER FAILURE INDICATION AND ISOLATION

(71) Applicant: Baker Hughes Oilfield Operations LLC, Houston, TX (US)

(72) Inventors: Shah Sakhawat, Houston, TX (US);
John S. Holmes, Houston, TX (US);
Paul Roffmann, Houston, TX (US);
Jochen Schnitger, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/747,086

(22) Filed: Jan. 20, 2020

(65) Prior Publication Data
US 2021/0222506 A1    Jul. 22, 2021

(51) Int. Cl.
*E21B 33/064* (2006.01)
*G06F 1/26* (2006.01)

(52) U.S. Cl.
CPC ............ *E21B 33/064* (2013.01); *G06F 1/263* (2013.01)

(58) Field of Classification Search
CPC .................................................... E21B 33/064
See application file for complete search history.

(56) References Cited

U.S. PATENT DOCUMENTS

| | | |
|---|---|---|
| 5,835,322 A | 11/1998 | Smith |
| 9,557,794 B2 * | 1/2017 | Tenca ...................... G06F 1/263 |
| 10,138,712 B2 * | 11/2018 | Eriksen .................... E21B 41/00 |
| 2011/0025341 A1 | 2/2011 | Lupaczyk |
| 2011/0267070 A1 | 11/2011 | Spencer |
| 2011/0291661 A1 * | 12/2011 | Stokes .................... G01R 31/11 324/528 |
| 2011/0298467 A1 * | 12/2011 | Douglas ................. G01R 31/58 324/509 |
| 2016/0181780 A1 | 6/2016 | Hatter |

FOREIGN PATENT DOCUMENTS

| | | | |
|---|---|---|---|
| CN | 105696963 A | * 6/2016 | .......... E21B 33/064 |
| EP | 0240617 | 10/1987 | |
| JP | H06237193 A | * 8/1994 | |

OTHER PUBLICATIONS

International Search Report and Written Opinion dated Apr. 29, 2021 in corresponding PCT Application No. PCT/2021/013350.

* cited by examiner

*Primary Examiner* — Matthew R Buck
(74) *Attorney, Agent, or Firm* — Hogan Lovells US LLP

(57) ABSTRACT

A system for determining a fault in a subsea blowout preventer (BOP) stack includes a first sensor and a second sensor adapted to measure one or more properties of a subsea operation. The system further includes a first power supply adapted to provide operational power to the first sensor and a second power supply adapted to provide operational power to the second sensor. The system also includes a first power failure indicator and isolator (PFII) associated with the first sensor and the first power supply, the first PFII measuring a first pair of waveforms to identify a first fault and a second PFII associated with the second sensor and the second power supply, the second PFII measuring a second pair of waveforms to identify a second fault.

11 Claims, 7 Drawing Sheets

SYSTEM AND METHOD FOR POWER FAILURE INDICATION AND ISOLATION

BACKGROUND

1. Field of the Disclosure

The present disclosure relates to oil and gas drilling operations, and more specifically, to monitoring power supplies, such as subsea power supplies, to detect failures.

2. Description of Related Art

During oil and gas exploration operations, a wellbore may be drilled into a formation through a potential hydrocarbon-bearing region. To regulate pressure within the wellbore, a blowout preventer (BOP) system may be arranged at the wellbore. In subsea operations, control systems (which may have redundancies) may be deployed to regulate operation of the BOP. For example, redundant control systems may be referred to as blue and yellow control pods. In known systems, an umbilical cable sends information and electrical power to components, such as actuators, to control hydraulic valves. Systems may include a variety of sensors, components, and the like, which may operate using one or more power supplies.

One or more regulations may limit the amount of ground leakage that may be present within systems. However, due to the configuration of the systems, there may be insufficient capacity to separate ground impedance measurement for every circuit, and as a result, multiple circuits are covered by a single impedance measurement. Unfortunately, such a configuration leads to difficulties identifying specific faults or errors. For example, if a circuit includes multiple components, a non-critical fault may still lead to an alarm, which may cause operators to pull the BOP unnecessarily. These pulls may be costly for operators.

SUMMARY

Applicants recognized the problems noted above herein and conceived and developed embodiments of systems and methods, according to the present disclosure, for power supply monitoring.

In an embodiment, a system for determining a fault in a subsea blowout preventer (BOP) stack includes a first sensor adapted to measure one or more properties of a subsea operation. The system also includes a second sensor adapted to measure one or more properties of the subsea operation. The system further includes a first power supply adapted to provide operational power to the first sensor and a second power supply adapted to provide operational power to the second sensor. The system also includes a first power failure indicator and isolator (PFII) associated with the first sensor and the first power supply, the first PFII measuring a first pair of waveforms to identify a first fault and a second PFII associated with the second sensor and the second power supply, the second PFII measuring a second pair of waveforms to identify a second fault.

In another embodiment, a method for determining a fault includes generating a waveform. The method also includes measuring a first value of a reference waveform. The method further includes measuring a second value of a load waveform. The method also includes determining a difference between the first value and the second value is outside of a normal operating range. The method further includes generating an alarm. The result of the differential calculation provides information about the state of the current leakage in the system and can indicate the level of leakage as well as whether the leakage is in the positive or negative power supply rail.

In an embodiment, a system includes a blowout preventer (BOP) stack arranged at a subsea location. The system also includes a first control pod associated with the BOP stack, the first control pod including at least one power supply for providing electrical power to a component monitoring one or more operational parameters. The system also includes a second control pod associated with the BOP stack, the second control pod including at least one second power supply for providing electrical power to the component monitoring the one or more operational parameters, the second control pod being a backup control pod for the first control pod. The system further includes a power failure indicator and isolator (PFII) associated with the first control pod, the PFII diagnosing a fault in a connection between the at least one power supply and the component, the PFII adapted to isolate the fault between a plurality of components and provide an alarm indication in response to diagnosing the fault.

BRIEF DESCRIPTION OF DRAWINGS

Some of the features and benefits of the present disclosure having been stated, others will become apparent as the description proceeds when taken in conjunction with the accompanying drawings, in which.

Figure 1:
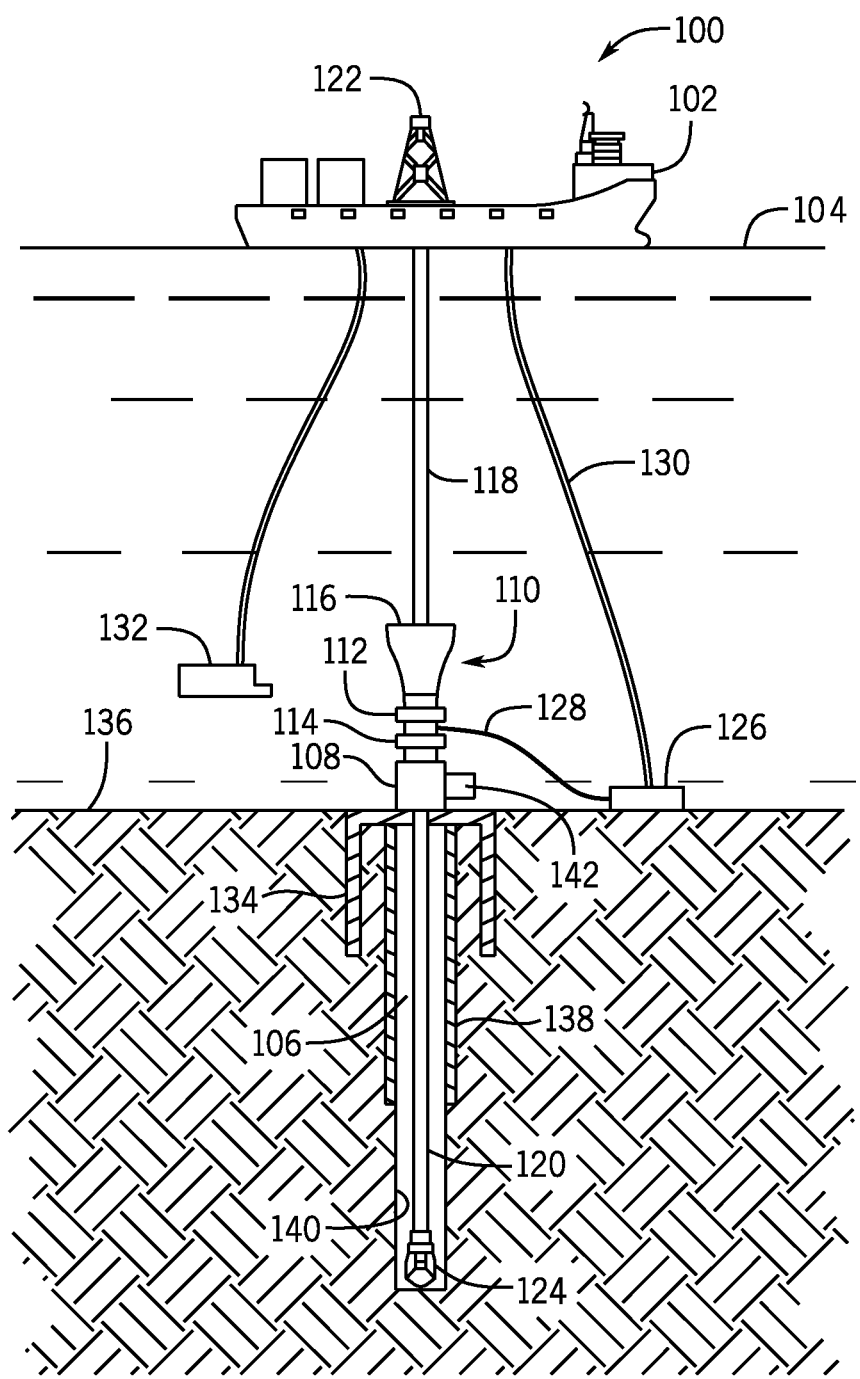
FIG. 1 is a schematic side view of an embodiment of an offshore drilling operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. It should be understood that reference numbers may be carried over between figures for similar elements, for simplicity of explanation, but that such usage should not be interpreted as a limitation on the scope of the various embodiments unless otherwise specifically stated.

Embodiments of the present disclosure include a power failure indicator and isolator (PFII) that resides within a subsea control system to measure ground impedance at an output of a plurality of direct current (DC) power supplies. Circuitry of the PFII is configured to measure impedance during a ground fault and isolates the faulted circuit from a main bus without pulling the BOP stack for trouble shooting. Embodiments enable location of ground faults while the BOP remains in the subsea environment, while also isolating ground faults. Periodic checks of instrumentation may be performed by enabling a chassis impedance measurement circuit.

Embodiments of the present disclosure may address and overcome drawbacks of present systems. For example, current systems may be deployed where a single circuit is evaluated to cover faults or failures for a plurality of different devices. As a result, an alarm may indicate a fault somewhere in the system without providing an identification of the particular component associated with the fault. These faults may lead to unnecessary stack pulls, where drilling operations are halted to evaluate the alarm, even when the alarm may be associated with a component where a redundant sensor may be utilized with low risk. In various embodiments, systems are deployed where components are associated with independent power supplies, each of which may include an independent PFII. However, it should be appreciated that multiple components may be evaluated with a single PFII. As a result, faults along particular circuits may be associated with alarms. Upon receipt of an alarm, an operator determines whether or not to continue operations or to pull the stack. In various embodiments, one or more logical systems, such as software operating with a set of rules, may be deployed to facilitate determination of whether to continue operations, for example, by providing notifications indicative of backup or redundant controls. In this manner, stack pulls may be reduced or eliminated, streamlining operations and reducing costs.

FIG. 1 is a side schematic view of an embodiment of subsea drilling operation 100. The drilling operation includes a vessel 102 floating on the sea surface 104 substantially above a wellbore 106. It should be appreciated that the vessel 102 is shown for illustrative purposes only, and in various embodiments, other structures such as drilling platforms may be utilized with embodiments of the present disclosure. A wellbore housing 108 sits at the top of the wellbore 106 and is connected to a blowout preventer (BOP) assembly 110, which may include shear rams 112, sealing rams 114, and/or an annular ram 116. One purpose of the BOP assembly 110 is to help control pressure in the wellbore 106. The BOP assembly 110 is connected to the vessel 102 by a riser 118. During drilling operations, a drill string 120 passes from a rig 122 on the vessel 102, through the riser 118, through the BOP assembly 110, through the wellhead housing 108, and into the wellbore 106. The lower end of the drill string 120 is attached to the drill bit 124 that extends the wellbore 106 as the drill string 120 turns. It should be appreciated that while a drilling operation is illustrated, embodiments of the present disclosure may also be incorporated into logging operations, stimulation operations, recovery operations, and the like. Additional features shown in FIG. 1 include a mud pump 126 with mud lines 128 connecting the mud pump 126 to the BOP assembly 110, and a mud return line 130 connecting the mud pump 126 to the vessel 102. It should be appreciated that the illustrated mud pump 126 is at a subsea location, but in other embodiments, the mud pump 126 may be arranged on the vessel 102. Moreover, in embodiments, the mud pump 126 may receive a mud supply from a pit or mud shake on the vessel 102. A remotely operated vehicle (ROV) 132 can be used to make adjustments to, repair, or replace equipment as necessary. Although the BOP assembly 110 is shown in the figures, the wellhead housing 108 could be attached to other well equipment as well, including, for example, a tree, a spool, a manifold, or another valve or completion assembly.

One efficient way to start drilling the wellbore 106 is through use of a suction pile 134. Such a procedure is accomplished by attaching the wellhead housing 108 to the top of the suction pile 134 and lowering the suction pile 134 to a sea floor 136. As interior chambers in the suction pile 134 are evacuated, the suction pile 134 is driven into the sea floor 136, as shown in FIG. 1, until the suction pile 134 is substantially submerged in the sea floor 136 and the wellhead housing 108 is positioned at the sea floor 136 so that further drilling can commence. As the wellbore 106 is drilled, the walls of the wellbore are reinforced with concrete casings 138 that provide stability to the wellbore 108 and help to control pressure from the formation.

During operations, such as drilling operations, mud is injected into the wellbore 106 via the drilling string 120. For example, the mud pump 126 may receive drilling mud from the vessel 102 and direct the mud through the drill string 120. The mud flows through the drilling string 120 and exits at the drill bit 124, carrying rock away from the bit 124 and also cooling the bit. The mud enters an annulus 140 surrounding the drill string 120. Advantageously, this mud may be utilized to provide pressure control within the wellbore 106, for example, due to pressures from the formation. The mud may fill the wellbore 106 and the riser 118, where it is returned to the vessel 102 for processing and reuse.

During these operations, the BOP 110 may include one or more control systems 142. The control systems 142 may direct hydraulic fluid toward the components of the BOP 110, for example, toward the various rams. The control systems 142 may be arranged with redundancies, for example, by using two or more control systems 142 with the BOP 110. As will be described herein, various components of the control systems 142 may utilize one or more power supplies in order to perform operations. Power lines may be insulated due to the subsea environment, where ingress of fluid, among other potential operational challenges, may lead to faults. These faults may be detected, but present systems may detect the fault on a circuit level, rather than individually for separate components. As a result, the BOP 110 may be pulled to investigate the fault, even if the fault is a minor, non-critical component. Systems and methods of the present disclosure describe an improved system for identifying faults for individual components and alerting operators of these conditions, where the operator can then determine how to proceed.

Figure 2:
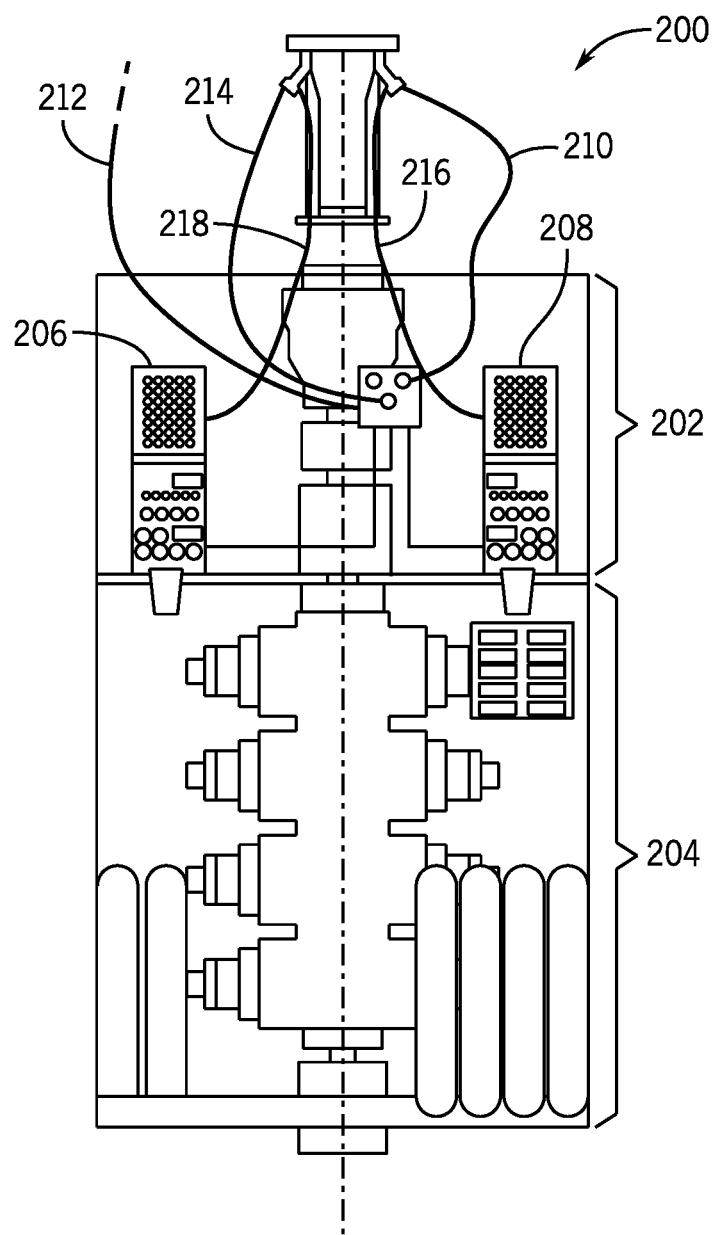
FIG. 2 is a schematic side view of an embodiment of a blowout preventer (BOP) stack, in accordance with embodiments of the present disclosure.

FIG. 2 is a schematic view of an embodiment of a BOP stack 200, which includes a lower marine riser package 202 and a lower stack 204. It should be appreciated that various components have been removed or will not be described for clarity. The illustrated BOP stack 200 includes first control pod 206 (e.g., blue pod) and a second control pod 208 (e.g., yellow pod). These control pods 206, 208 may include one or more sensors, power supplies, and the like. Moreover, various sensors for measuring one or more properties of the subsea operation may be present and associated with the BOP stack 200. As noted above, the redundancies may provide operational benefits where an upset or failure with the first pod 206 may be overcome using the second pod 208, thereby eliminating extra operational steps and time to remove the BOP stack 200 from service. In the illustrated embodiment, various conduits 210, 212, 214, 216, 218 extend from a riser 220 to the control pods 206, 208. For example, the conduits 210, 212, 214, 216, 218 may be used for hydraulic controls, power controls, communications, and the like.

In various embodiments, information may be transmitted to and from the control pods 206, 208, which may be further supplied to a surface location. For example, operational information may be provided to enable operators to adjust drilling operations and the like. In various embodiments, different values for various pieces of information may be indicative of undesirable operating conditions. For example, pressures above a certain level, forces on a drill bit, and the like may cause operational upsets that may be avoided if operators respond with modifications to drilling operations. However, it should be appreciated that some of these systems may be deemed "non-critical," while others are "critical." It should be appreciated that a sensor being considered "critical" is not intended to reflect a component that is required for operation of the present disclosure, but rather, to reflect a component that an operator has deemed as having a threshold level of importance for drilling operations. As a result, the terms "critical" and "non-critical" are used to describe components having importance values above and below a threshold, respectively. For example, a "critical" component may be a component without a backup, while a "non-critical" component may have a redundancy or information obtained by the component may be derived from other components.

As noted above, present systems may have difficulty identifying specific components that include faults and providing that information to an operator for a determination on how to proceed. Rather, existing systems identify entire circuits or groups of component with errors. In various embodiments of the present disclosure, individual power supplies may be deployed for individual component where faults are evaluated using the PFII. Upon detection of a fault, a signal may be transmitted to an operator at a surface location.

Figure 3:
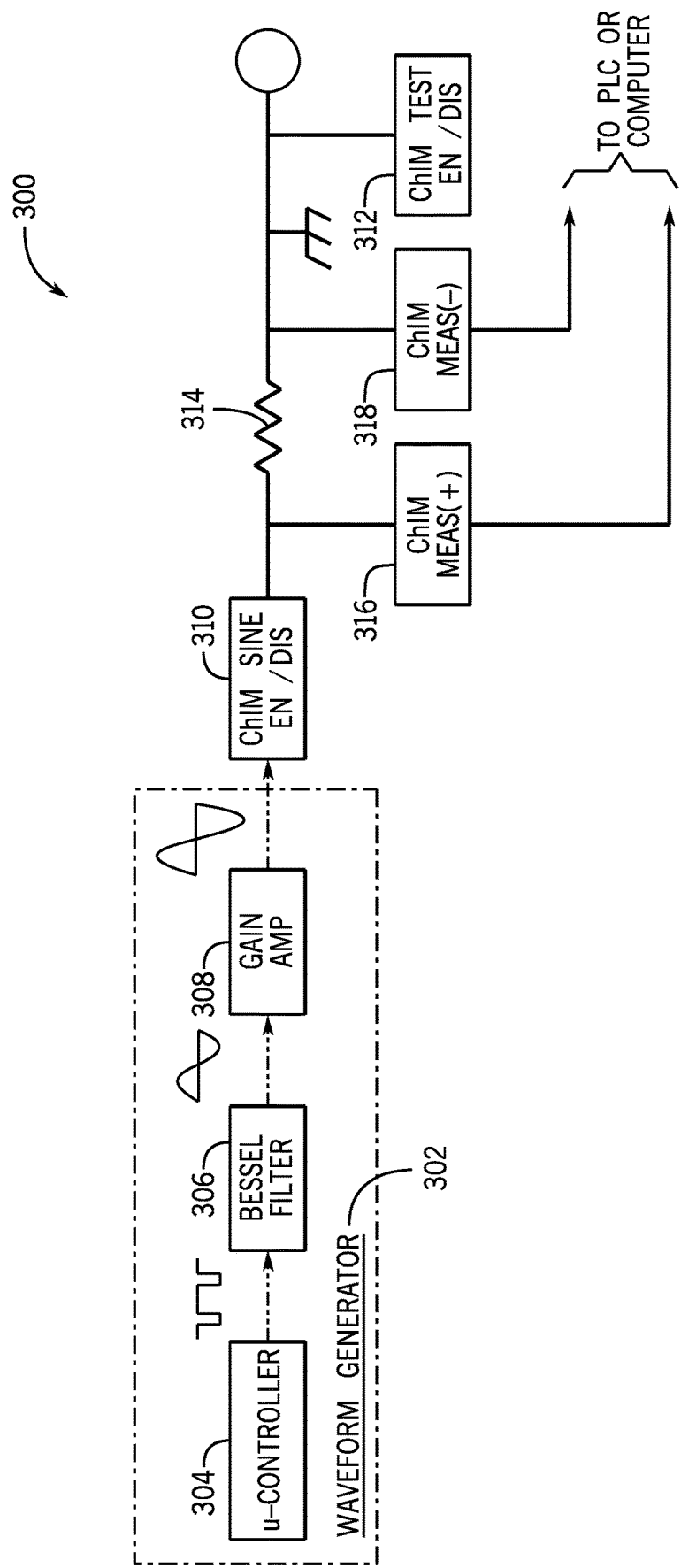
FIG. 3 is a schematic diagram of an embodiment of a power failure indicator and isolator (PFII), in accordance with embodiments of the present disclosure.

FIG. 3 is a schematic diagram of an embodiment of a PFII 300 that may be utilized with embodiments of the present disclosure. It should be appreciated that the PFII 300 may include circuitry and/or logic that may be integrated, at least in part, into one or more control systems that may be utilized in a subsea environment. The illustrated embodiment includes a waveform generator 302 having a controller 304, a filter 306, and an amplifier 308.

In operation, the controller 304, which may be a microcontroller, generates a pulse width modulated (PWM) signal. In various embodiments, a maximum duty cycle may be approximately 95%, however, it should be appreciated that other cycles may be utilized and that 95% is provided as an example. The generated PWM signal is fed into the filter 306, which may be a Bessel filter, which removes a carrier frequency from the PWM signal. For example, the filter 306 may allow frequencies below 0.7 Hz to remove the carrier signal. As a result, the resultant output is a sine wave. Thereafter, the amplifier 308 receives the sine wave to produce a desired peak-to-peak waveform. In various embodiments, the sine wave may be approximately 0.1 Hz and the peak-to-peak waveform may be amplified to 10V.

The output of the waveform generator 302 may be directed toward a gate 310, which may be referred to as a chassis impedance measurement (CHIM) gate. The CHIM gate enables and/or disables the sine signal, distributed from the waveform generator 302, for determining a measurement. For example, the CHIM gate 310 may block measurements at certain times and enable measurements when receiving a signal to evaluate leakage or faults within the system. In other words, the CHIM gate 310 may enable or block continuous measurements or may establish measurements at intervals or the like, as controlled by an operator or control system. The result of the CHIM gate 310 may lead to reduced power consumption and/or reduced data acquisition, which may be desirable because continuous acquisition may utilize excessive bandwidth. It should be further appreciated that each subsystem of the first and second control pods 206, 208 may include an independent PFII. As a result, the CHIM gate 310 may be utilized to regulate an order of operations, for example, where a first PFII receives a measurement before instructing a second PFII to conduct a measurement. In this manner, interference between systems may be avoided. However, it should be appreciated that, in various embodiments, measurements may be conducted at substantially the same time or with at least a portion of one measurement overlapping at least a portion of another.

The illustrated embodiment further includes a testing module 312, which may be utilized to enable the operator to test functionality of the circuit to a known resistor 314 placed in between the CHIM gate 310 and the testing module 312. For example, in embodiments, a signal may be transmitted to the testing module 312 and a return signal is measured by accounting for the resistor 314. In various embodiments, the testing module 312 may be utilized in order to verify that alarm readings are received at a surface location. The CHIM circuit may be activated and then the testing module 312 is utilized to remove resistors from the load, leading to an essentially open circuit. This may also provide a reference for future measurements.

Embodiments of the present disclosure further enable measurement of current leakage, for example, utilizing a first CHIM measurement module 316. In the illustrated embodiment, the first CHIM measurement module 316 measures a reference waveform. For example, once the sine wave from the waveform generator 302 is transmitted to the chassis, a measurement is performed to determine if there is current leakage between a +24V and the chassis or DC common and the chassis. Impedance may be measured by taking the difference between the first CHIM measurement module 316 and a second CHIM measurement module 318 across the resistor 314. The resulting measurement provides the current to the load, with the first CHIM measurement module 316 providing the voltage to the load. The modules 316, 318 may include amplifiers, that are substantially identical, to scale measured voltages and provide a buffer prior to transmitting the signals.

Embodiments of the present disclosure may include software instructions to measure impedance of a fault directly. For example, impedance may be evaluated by scaling inputs, calculating a resistance for the CHIM circuit, calculating a load current for peak-to-peak values, and then calculating a chassis fault impedance for peak-to-peak values of the voltage and current. Such measurements may supply information regarding the location of the fault. For example, a negative value may be indicative of a fault to the 24V rail and not to the DC common.

In various embodiments, switching circuits may be deployed to provide isolation. One instance of the switching circuit isolates the sine wave from the chassis while a measurement is not being made. The other instance of the switching circuit switches a tight tolerance resistor into the ground to provide a self-test function. In embodiments, a self-test may include operation of a pair of switching circuits.

Figure 4:
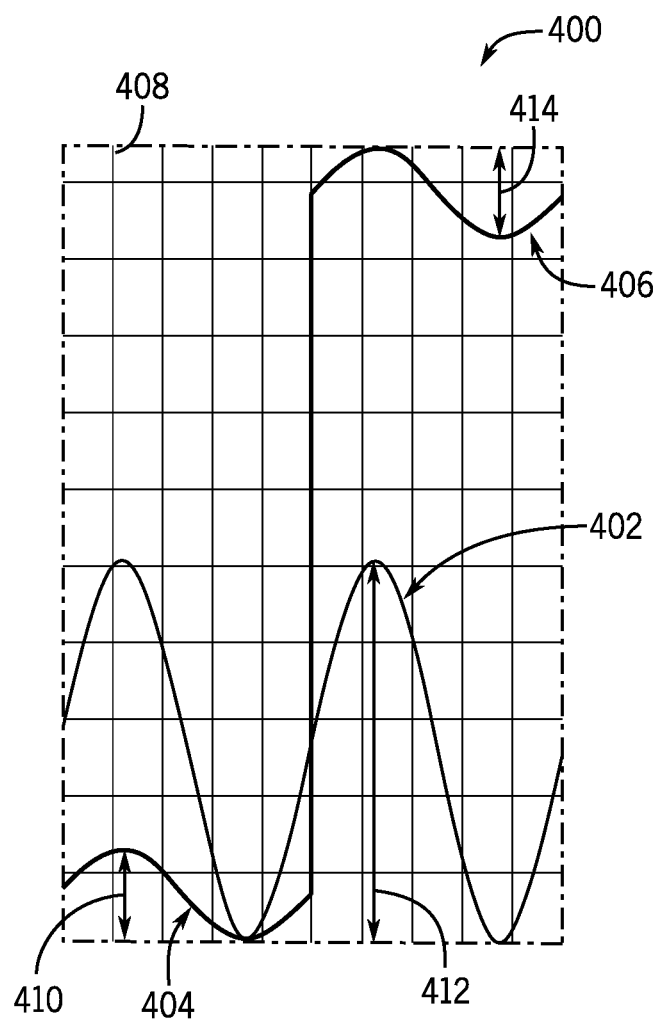
FIG. 4 is a graphical representation of an embodiment of a waveform evaluation, in accordance with embodiments of the present disclosure.

FIG. 4 is a graphical representation of a measurement cycle 400. As described above, in various embodiments, a waveform generator 302 may transmit a signal, such as a sine wave, into the chassis and measure a difference between a first measurement module and a second measurement module. In the illustrated embodiment, a normal signal 402 is illustrated, which is illustrative of a sine wave. As illustrated, DC offset of the signal and the amplitude of the signal change when a fault is present. No fault would produce no difference in the signals across the resistor. A fault will produce a smaller value waveform with a DC offset Such a fault is illustrated in a first fault signal 404 and a second fault signal 406, which are both imposed on the same graphical interface 408 to illustrate a difference when compared to the normal signal 402.

Turning to the first fault signal 404, a peak-to-peak amplitude 410 is less than a peak-to-peak amplitude 412 of the normal signal 402, indicating a fault in the DC common. Additionally, the second fault signal 406 has a peak-to-peak amplitude 414 that is also less than the peak-to-peak amplitude 412 of the normal signal 402, as well as being shifted. Accordingly, the amplitude of the signal, as well as relative values and positions, may be utilized in order to identify which system includes the fault, providing an improvement over existing configurations where the presence of a fault may be detected, but the fault is not isolated or identified to a particular power source.

Figure 5:
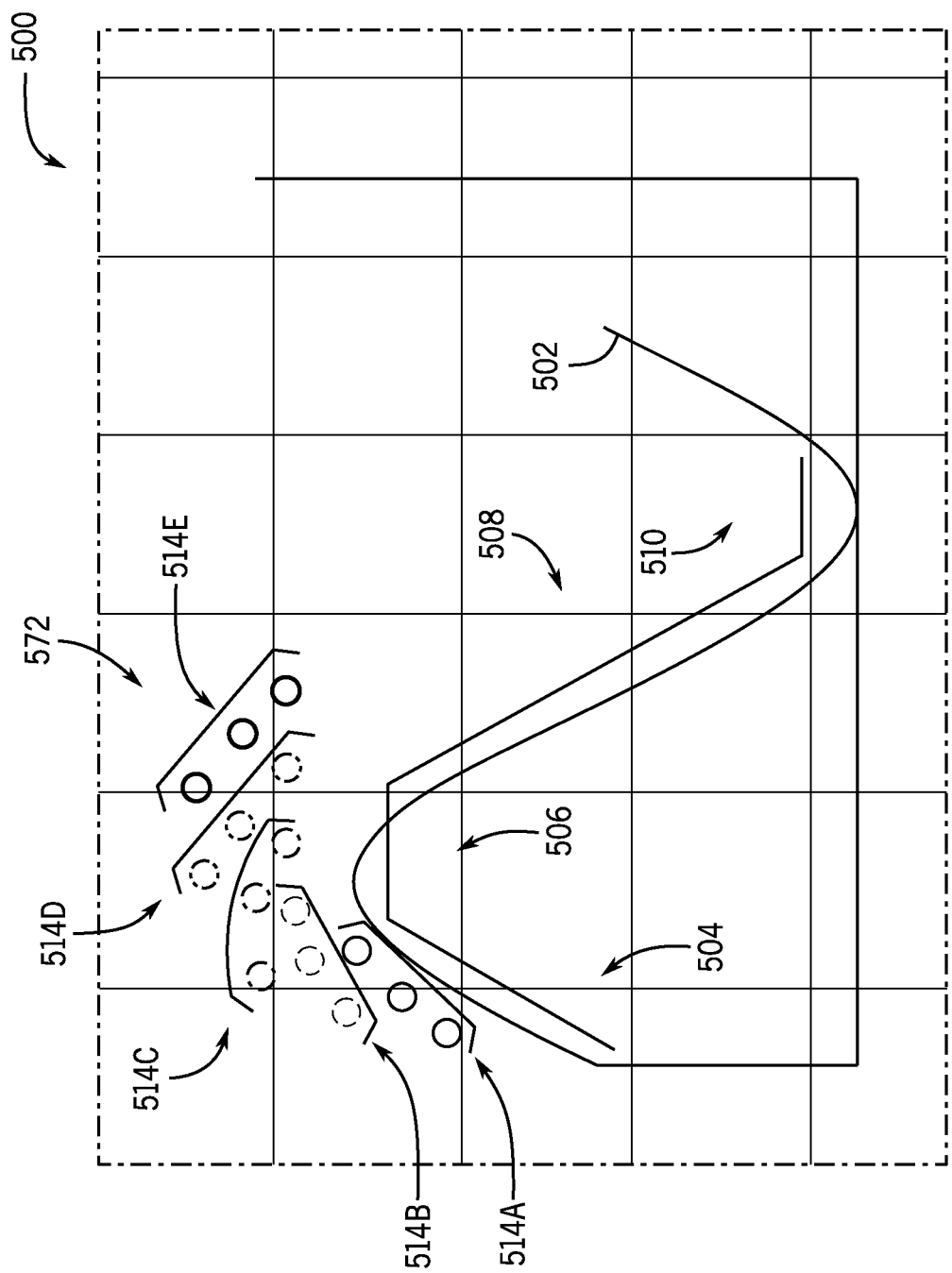
FIG. 5 is a graphical representation of an embodiment of a waveform evaluation, in accordance with embodiments of the present disclosure.

FIG. 5 is a graphical representation 500 of a peak detection algorithm that may be utilized with embodiments of the present disclosure. In operation, values from the CHIM circuit are measured as peak-to-peak values because RMS or instantaneous values may lose information or result in an incorrect result. However, a programmable logic controller (PLC) receiving signals may not be synchronized with the controller generating the sine waves (e.g., the waveform generator 302). Accordingly, the peak detection algorithm may be implemented to determine the peak-to-peak values.

Embodiments of the present disclosure are implemented to overcome problems such as lack of synchronization, lack of cross signals, and using a discrete sample instead of continuous data. As a result, embodiments may be described as being state orientated, in that data is acquired at various states of the function, rather than evaluating the information as a continuous or near-continuous stream. FIG. 5 illustrates an example sine wave 502. A number of states 504, 506, 508, 510 are illustrated along the sine wave. For example, the state 504 is indicative of an increasing portion, the state 506 is a peak, the state 508 is a decreasing portion, and the state 510 is a minimum. With sufficient sampling speeds, a state diagram may be established between the various states. However, it will be appreciated that the time spent at the states 506, 510 is less than the time in states 504, 508. In various instances, errors in sampling may cause the states to be missed. As a result, it may be beneficial to evaluate the state 504 and the state 508 as log minimums and log maximums, respectively.

FIG. 5 further illustrates dot groupings 512. The dot groupings 512 include a series 514 of measurements, taken at different points in time. In the illustrated embodiment, the series 514A is taken earlier in time than series 514B, which is taken earlier than the series 514C, and so forth. The illustrated embodiment includes a three-deep array for each series 514, but it should be appreciated that more or fewer measurements may be utilized, with three being provided as an example. Regarding the series 514A, a number of measurements are taken, represented by the dots. When a new value of the sine wave is read, the series 514B is generated, with the oldest value (furthest to the left) being discarded. The other values are shifted to the older positions and the new value is placed into the array (to the right). Given the example in FIG. 5, after three readings/measurements, the value of the array is represented by the series 514A. Then, a new reading comes in and the new values in the array are represented by the series 514B. Subsequently, another new value comes in, and the values in the array are represented by the series 514C, continuing to the series 514D and the series 514E. The updated array values are illustrative of how buffer values are changing over time with respect to the waveform. As will be explained, the differences between the arrays may be useful in determining the state.

In an example, Equation 1 provides an example of change in value, which is represented as current (I) in this embodiment, $$I\Delta = I(1) - I(0), \quad \text{Equation 1}$$

where I is a function of the current and the numerical values represent data points in the arrays of dot groupings. This initial delta may also be evaluated against Equation 2, which may be referred to as delta prime, $$I\Delta' = I(2) - I(1), \quad \text{Equation 2}$$

where I is a function of the current. As illustrated, Equation 1 determines a different between a first position and a second position. A positive value would be indicative of a positive slope, while a negative value would be indicative of a negative slope. Similarly, Equation 2 determines a difference between a second position and the first position, where again a positive value would be indicative of a possible slope and a negative value would be indicative of a negative slope.

When evaluating the different states of the waveform, the delta and delta prime values may be utilized. For example, different relationships may be established for transitions through the states of the sine wave. In this example, where both the delta and delta prime values were positive, the sine wave would be at the state 504. Where the delta is positive and the delta prime is negative or equal to zero, the sine wave would be at the state 506. Where the delta is negative or equal to zero and the delta prime is also negative or equal to zero, the sine wave would be at the state 508. Where the delta is negative or equal to zero and the delta prime is positive, the sine wave would be at the state 510. The table below illustrates these relationships.

| IΔ | IΔ' | State |
|---|---|---|
| >0 | >0 | State 504 |
| >0 | <=0 | State 506 |
| <=0 | <=0 | State 508 |
| <=0 | >0 | State 510 |

Furthermore, peak detection may also be determined utilizing the delta and delta prime values. For example, a minimum (e.g., state 510) may be determined when a Previous State is state 508 and a Current State is less than or equal to the Previous State. Similarly, a maximum (e.g., state 506) may be determined when a Previous State is state 504 and a Current State is less than or equal to the Previous State. In this manner, the states of the sine wave may be determined, even with reduced sampling.

It should be appreciated that various embodiments of the present disclosure may also include various filters. The filters may employ a weighted average technique utilizing a single memory location and a constant in order to simplify programming and reduce memory usage. By way of example only, the weight, beta, a buffer, and a current reading may be utilized to generate a low pass filter.

Figure 6:
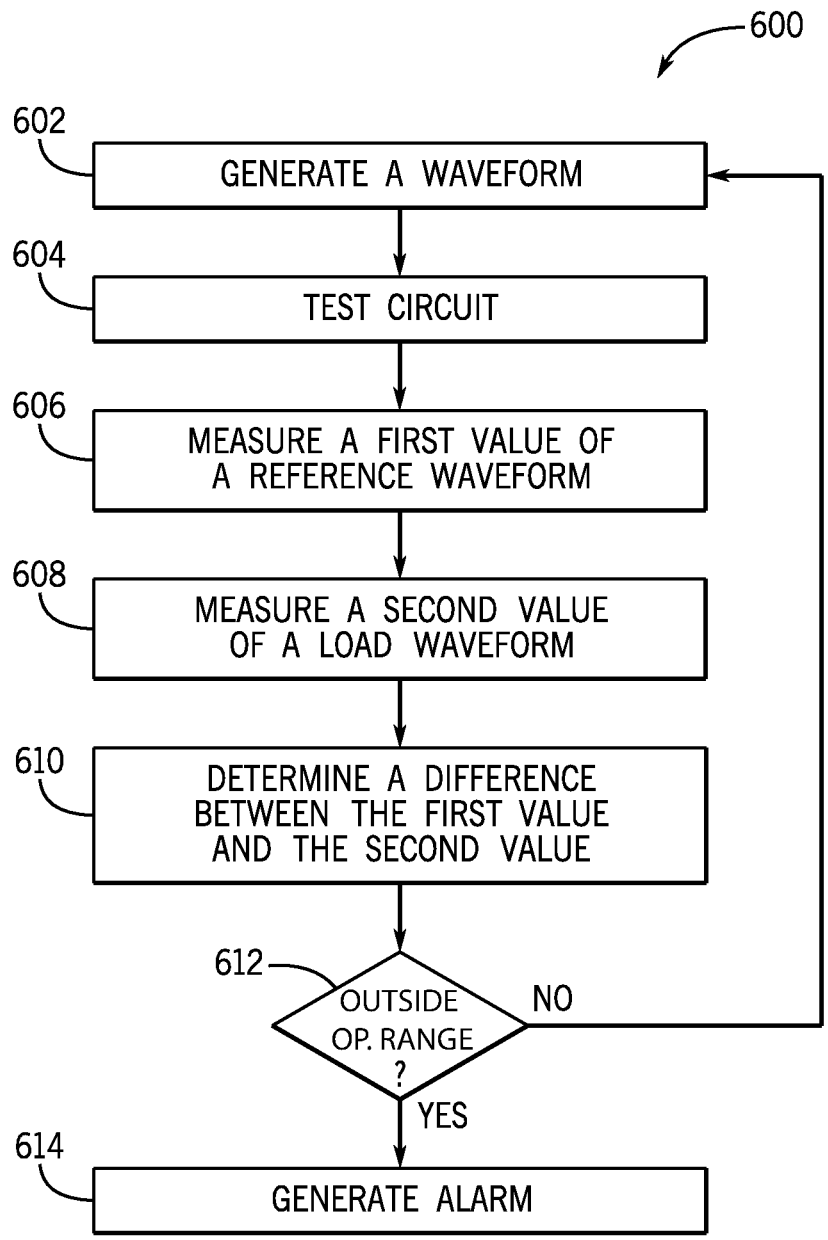
FIG. 6 is a flow chart of an embodiment of a method for determining a fault in a subsea system, in accordance with embodiments of the present disclosure.

FIG. 6 is a flow chart of an embodiment of a method 600. It should be appreciated that the method may include more or fewer steps. Additionally, the steps of the method may be performed in a different order or in parallel, unless otherwise specifically stated. This example includes generating a waveform 602. For example, the waveform may be generated using one or more waveform generators. As noted above, the waveform may be otherwise manipulated or modified upon generation, for example, by removing the carrier, amplifying the waveform, or the like. A circuit that is being evaluated is optionally tested 604. For example, a test may be performed at different intervals, for example after a certain passage of time. However, in other embodiments, the test may be performed prior to information acquisition in each instance. A first value of a reference waveform is measured 606, for example, using a first measurement module. A second value or a load waveform is also measured 608. A difference between the measurements is determined 610, and evaluated against a normal operating range 612. If the difference is outside of the normal operating range (e.g., above or below the normal operating range), an alarm may be issued 614. The alarm may be indicative of a fault or other error within the system. As noted above, in various embodiments, different components and/or subsystems may include individual PFIIs for performing fault testing, and as a result, the indication of an error may be localized to a specific component, rather than provide information as to the circuit as a whole. Furthermore, the difference value obtained may also be indicative of the error, as described herein.

Figure 7:
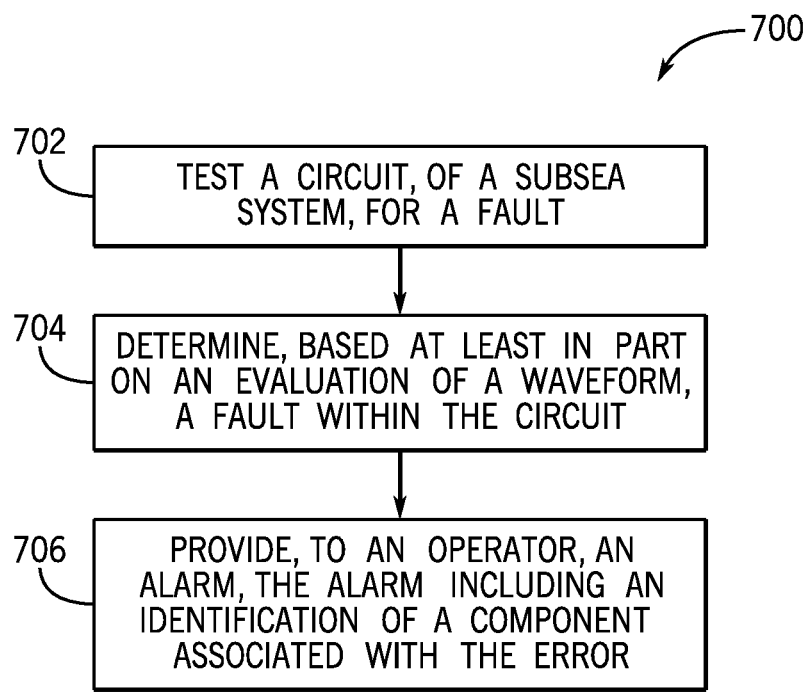
FIG. 7 is a flow chart of an embodiment of a method for providing an alarm in response to detecting a fault in a subsea system, in accordance with embodiments of the present disclosure.

FIG. 7 is a flow chart of a method 700 for providing an alarm to an operator. This example begins with testing a circuit for a fault 702. For example, a PFII may be integrated into a subsea component that includes a power supply, among other features, to test for a fault. A fault may be determined by evaluating a waveform 704. For example, as noted above, a waveform may be evaluated across different measurement modules to determine a difference, where a difference outside of a normal operating range may be indicative of a fault. Upon determination of a fault, an alarm may be transmitted to an operator 706. In various embodiments, providing just an alarm is insufficient, as various components may be arranged downhole. As a result, the alarm may be particularly associated with an identified component of the subsea system. Therefore, the operator may evaluate the alarm to determine whether action is warranted. For example, an alarm for a non-critical component may be mitigated while an alarm for a critical component may lead to pulling the stack.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for determining a fault in a subsea blowout preventer (BOP) stack, comprising:
   a first sensor adapted to measure one or more properties of a subsea operation;
   a second sensor adapted to measure one or more properties of the subsea operation;
   a first power supply adapted to provide operational power to the first sensor;
   a second power supply adapted to provide operational power to the second sensor;
   a first power failure indicator and isolator (PFII) associated with the first sensor and the first power supply, the first PFII measuring a first pair of waveforms to identify a first fault; and
   a second PFII associated with the second sensor and the second power supply, the second PFII measuring a second pair of waveforms to identify a second fault, the first fault and the second fault indicated on a same graphical interface to provide signal differences.

2. The system of claim 1, wherein each of the first PFII and the second PFII comprise:
   a waveform generator, the waveform generator producing a sine wave directed into a chassis;
   a first measurement module, measuring a reference waveform;
   a second measurement module, measuring a load waveform; and
   a resistor, arranged between the first measurement module and the second measurement module.

3. The system of claim 2, wherein the waveform generator comprises:
   a microcontroller adapted to generate the sine wave;
   a filter adapted to remove a carrier frequency of the sine wave; and
   an amplifier.

4. The system of claim 2, wherein each of the first PFII and the second PFII further comprises:
   a testing module adapted to receive the sine wave, the testing module positioned past the resistor.

5. The system of claim 1, further comprising:
   a computer system communicatively coupled to the first PFII and the second PFII, the computer system to receive signals that enable the same graphical interface of the computer system to provide the signal differences.

6. The system of claim 1, further comprising:
an alarm, the alarm being activated by the detection of at least one of the first fault or the second fault, the alarm identifying the respective sensor associated with the respective fault.

7. A system, comprising:
a blowout preventer (BOP) stack arranged at a subsea location;
a first control pod associated with the BOP stack, the first control pod including at least one power supply for providing electrical power to a component monitoring one or more operational parameters;
a second control pod associated with the BOP stack, the second control pod including at least one second power supply for providing electrical power to the component monitoring the one or more operational parameters, the second control pod being a backup control pod for the first control pod; and
a power failure indicator and isolator (PFII) associated with the first control pod, the PFII diagnosing a fault in a connection between the at least one power supply and the component, the PFII adapted to isolate the fault between a plurality of components and provide an alarm indication in response to diagnosing the fault, the fault to be indicated along with reference on a same graphical interface to provide signal differences.

8. The system of claim 7, further comprising:
a second PFII associated with the second control pod, wherein each of the PFII and the second PFII operate independently.

9. The system of claim 7, wherein the at least one power supply provides isolated power to the component and a diagnosis of the fault corresponds to the component.

10. The system of claim 7, further comprising:
a second component, monitoring the one or more operational parameters, the second component being a redundancy for the component, wherein a diagnosis of the fault for the component is determined non-critical when the second component is operational.

11. The system of claim 7, wherein the PFII determines a difference between a reference waveform and a load waveform.

* * * * *